COLD PROCESS SYSTEM

HOT PROCESS SYSTEM 3,740,330
PROCESS FOR THE VOLUME REDUCTION OF SLUDGE FORMED IN THE SOFTENING OF WATER
John Stephen Kneale, New Monmouth, N.J., assignor to Sybron Corporation, Rochester, N.Y.
Filed June 21, 1971, Ser. No. 154,781
Int. Cl. C02b 1/02, 1/22
U.S. Cl. 210—46                8 Claims

ABSTRACT OF THE DISCLOSURE

A process is described for the volume reduction of sludge precipitated during the chemical softening of water. The volume of sludge is reduced by pre-treating the raw water with lime or lime-soda ash in the presence of catalyst granules in an inverted, frusto-conical tank. The pre-treatment step is followed by a second step which comprises treating the water in a cold or hot process water softener with additional chemical agents to remove remaining calcium hardness, magnesium hardness, silica and the like.

BACKGROUND OF THE INVENTION

This invention relates to improvements in or relating to a process for treating water, and more particularly, to a process for reducing the volume of sludge precipitated during the softening of water with chemical agents.

One type of process used to soften water comprises treating raw water with chemicals to precipitate the hardness ions therefrom. The hardness ions are generally calcium and magnesium. Silica is also an undesirable constituent of raw water and is also generally removed by the softening process. Other ions, such as, iron and manganese, impurities, turbidity and color are also removed from the water during the softening process. The reaction or reactions involving the chemical softening of water may be carried out at or near the temperature of the influent water or at an elevated temperature. Those softening processes which are carried out at the temperature of the influent water or at ambient temperature, are designated herein as cold process water softeners, and those softening processes which are carried out at elevated temperature, e.g., by injecting steam, are referred to as hot process water softeners.

The hot process water softeners are disclosed in U.S. 3,393,804, U.S. 2,917,176 and U.S. 3,375,930. In essence, water in the hot process water softeners is heated to near boiling before it contacts the softening chemicals. A typical hot process water softener and settling tank comprises an upper reaction compartment shaped like a funnel enclosed in an outer shell. The downcomer of the funnel extends into the lower regions of the vessel formed by the outer shell. The shape of the outer shell in the lower region of the tank may be conical, or angularly disposed baffles in the shape of a cone may be disposed in the lower regions of the outer shell. A sludge blanket, the sludge having been formed by the reaction of the chemical agents with the impurities found in the raw water, accumulates in the lower region of the tank. The precipitated solids which exit from the downcomer, move toward the conical bottom of the tank where they form the sludge blanket which is maintained in suspension by the upward flow of the treated water which also exits through the downcomer. As the treated water flows through this sludge blanket, most of its turbidity is trapped in the suspended sludge and removed. The effluent water continues in an upward flow in a lower compartment, and clarified (softened) water exits from the tank through a collector in the upper region of the lower compartment.

Other hot process water softeners wherein there is no sludge blanket accumulation through which the treated water passes, are also known in the art.

Several types of cold process water softeners which operate upon a solids contact, upflow, sludge blanket principle, are known in the art. When precipitates are formed in the water as the result of chemical reactions brought about by the addition of water softening chemicals, they either settle slowly toward the bottom of the container or in some systems by a combination of mechanical agitation and hydraulic flow, they are kept suspended within the reaction chamber. Generally, the water passes upward through the precipitates, leaving the precipitates sharply behind, and the softened water flows from the top of the unit as a clear liquid. One of these sludge contact devices is illustrated in U.S. 3,113,100.

Another type of water softening system wherein the water undergoes treatment with chemical agents to remove hardness ions, is the type where the precipitate settles out of the water and forms a layer on the bottom of the tank, container or reaction chamber. Essentially, in this type of unit there is no sludge contact between the treated water and sludge. In this type of system precipitates merely form from the reaction between raw water and softening chemicals and settle to the bottom of the reaction chamber while softened water passes from the tank or container without passing through the precipitate (sludge blanket).

In all of the above discussed water softening processes and apparatuses the precipitate formed by the action of the chemical agents and the raw water forms a voluminous wet sludge which is about 2–10% solids and the remainder water. This wet sludge has a consistency similar to that of clay and is difficult to dispose of because it usually must be lagooned or otherwise dried prior to disposal.

At 10% solids by weight the sludge requires about 1.1 gallons of blowoff per pound of solids per 1000 gallons of water treated in the conventional cold process or hot process softening systems. At 2% solids by weight the sludge requires about 6 gallons of blowoff per pound of solids per 1000 gallons of water treated in the conventional precipitation system. The large amount of blowoff required in these conventional precipitation systems lowers the efficiency of the system and wastes the water being softened.

In the case of the hot process type water softener, large quantities of magnesium hydroxide precipitate are desirable to remove silica from water. However, in hot process water softeners, high concentrations of magnesium hydroxide cannot be retained in the reaction vessel or sludge accumulation chamber because the major portion of the precipitate removed from the raw water treated thereby is calcium hardness which is preferentially precipitated over magnesium hardness. Accordingly, in treating waters having a high calcium concentration it is not possible to maintain high concentrations of magnesium hydroxide precipitate and thereby produce sufficient magnesium hydroxide precipitate which will economically remove the silica from the water.

Another type of cold process water softening system is the inverted, frusto-conical tank wherein raw water is treated with softening chemicals in the presence of inert catalyst granules as disclosed by Zentner in U.S. 2,259,717. Calcium hardness and minor amounts of magnesium hardness are precipitated from the water in this system and a calcium-depleted water effluent flows from the system. The precipitated calcium hardness and the catalyst granules are removed in the form of a sand-like material with a minimal sludge volume. The inverted, frusto-conical cold process water softener is ideal for treating raw water having a high calcium carbonate content with lime or lime-soda ash. But, it is essentially limited to the removal of calcium carbonate hardness and has heretofore been used as a device to perform the entire water softening process, and accordingly, its use has been limited to the softening of waters having a magnesium content of under 80 p.p.m. at a temperature not in excess of 50° F. Furthermore, the inverted, frusto-conical water softener has heretofore been limited to the softening of well waters since it is not capable of removing turbidity from surface waters.

OBJECTS OF THE INVENTION

Accordingly, it is an object of this invention to provide a process for the volume reduction of sludge produced in the softening of water.

It is another object of this invention to provide a process for the softening of water wherein the calcium hardness removed from the water in the form of a calcium precipitate can be easily disposed of without lagooning.

It is another object of this invention to provide a process wherein water having much higher concentration of magnesium hardness can undergo treatment in cold process wherein water having much higher concentrations of calcium therein.

It is still another object of this invention to provide a process wherein the sludge volume diverted to sludge lagoons in water softening processes is substantially reduced.

Another object of this invention is to provide a process for the softening of water wherein the amount of water used in blowoff is substantially reduced.

Still another object of this invention is to provide a process for the softening of turbid waters wherein not only calcium hardness, but also magnesium hardness, silica, iron, turbidity, color and the like are removed with a substantial reduction in the volume of sludge.

Other objects and advantages of this invention will become apparent from the following detailed description taken in connection with the accompanying drawings.

SUMMARY OF THE INVENTION

According to the present invention, the volume of sludge precipitated during the chemical softening of water is substantially reduced by pre-treating the raw water with lime in the presence of catalyst granules in an inverted, frusto-conical tank prior to treating said water in a second precipitation stage which is a cold or hot process water softener. The raw water is pre-treated with lime or lime-soda ash in the inverted, frusto-conical tank to remove substantial amounts of calcium hardness and minor amounts of magnesium hardness from the raw water, and the calcium depleted water is treated in a second precipitation stage with additional chemical agents to remove remaining calcium hardness, magnesium hardness, silica, and/or iron and the like. The process of the present invention is applicable to both the cold process water softening systems and the hot process water softening systems. Solids accumulations are removed from both stages of the system. The precipitate removed from the inverted, frusto-conical water softening pre-treatment stage has a consistency similar to and can be handled like sand. It has a solids content of at least about 75% solids by weight. Under the process of the present invention 0.05 gallon of blowoff per pound of solids per 1000 gallons of liquid treated is required to remove the precipitated solids from the pre-treatment step. By the present invention the blowoff volume is reduced surprisingly by a factor of up to 120. The sludge from the second precipitation stage retains water and must be either dried, lagooned or disposed of by some other means.

The process of the present invention can be used on raw waters having any level of magnesium content especially when used with the hot process water softener stage where magnesium is removed as magnesium hydroxide and silica is absorbed thereby. Temperature limitation is also no obstacle in the practice of the present invention.

In the two stage water softening system, calcium hardness is primarily removed in the pre-treatment stage in the form of a granular or sand-like material and magnesium, iron, silica, and/or other materials are primarily removed in the second stage by means of precipitation and/or absorption in a cold process water softening system or in a hot process water softening system. By this process substantial amounts of sludge are eliminated in the first stage as a sand-like material, and lesser amounts of a paste-like sludge are removed in the second stage. Turbid surface waters as well as clear well waters can be softened in accordance with the present invention. Chemical softening of water is defined herein as the removal of substantially all calcium hardness, magnesium hardness, silica, turbidity and the like, and a softened water is a water from which substantial amounts of hardness ions, silica, iron, manganese, turbidity, color and/or other impurities have been removed.

Calcium depleted water or calcium hardness depleted water as used herein means water from which substantially all calcium bicarbonate has been removed. The calcium depleted water may have minor quantities of calcium therein. Magnesium hardness, silica, iron, manganese, turbidity, and/or other materials may be present in high concentrations or trace quantities in calcium depleted water.

DESCRIPTION OF THE PREFERRED EMBODIMENTS

Figure 1:
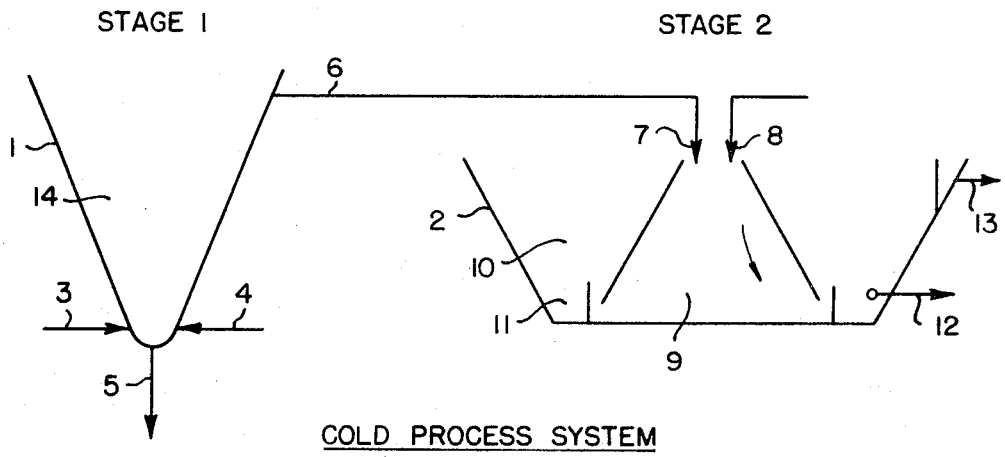
FIG. 1 is a schematic representation of a cold process water softening system consisting of an inverted, frusto-conical tank first stage and a solids contact, upflow, sludge blanket cold process precipitation second stage.

In the drawings, FIG. 1 is representative of a cold process system in which the sludge volume of the material precipitated upon the complete softening of the water is reduced by a factor up to 120. The cold process system of FIG. 1 consists of two stages. The first stage designated generally by the numeral 1 is a gravity feed, inverted, frusto-conical tank. The second stage, designated generally by numeral 2, is a cold process, solids contact, upflow, sludge blanket precipitation stage which may be referred to as a secondary precipitation stage. Raw water entering the system at raw water inlet 3 is first treated in stage 1 followed by treatment in stage 2. The frusto-conical water softener is the type disclosed in U.S. 2,259,717 which is incorporated herein by reference. Raw water entering the inverted frusto-conical tank at or near the apex thereof via raw water inlet 3 is treated with chemicals which are injected into the tank at chemical inlet 4. The water enters the tank through tangential inlets near the bottom or apex of the tank, and the raw water and chemicals are mixed and pass at a high rate of flow through a bed of granular inert material designated herein as catalyst granules (not shown), which are maintained partially or completely in suspension by the motion or turbulence of the water being treated. The suspended granular bed acts as a catalyst to hasten the reaction between the lime fed into the system at chemical inlet 4 and the calcium bicarbonate in the raw water which imparts hardness thereto. Solid reaction products or precipitates tend to form or plate out on the catalyst granules in the area of the mixing and precipitation zone designated by 14. As the precipitate plates out on the catalyst granules, the granules gradually increase in size, and when they have grown so large as to have diminished catalytic effectiveness they are discharged at the precipitate blowdown outlet 5. This precipitate which is substantially calcium hardness precipitated in the form of calcium carbonate passes from blowdown outlet 5 in the form of a pellet or sand-like material.

Although minor amounts of magnesium are removed from the raw water in stage 1, stage 1 is generally specific for calcium hardness removal and alkalinity reduction. The water which is depleted in calcium hardness and accordingly, to a certain extent, softened in the first stage, is removed from the first stage at calcium depleted water outlet 6. The calcium depleted water then passes to the second stage which in FIG. 1 is a solids contact, upflow, sludge blanket, cold process precipitation stage, where it enters said precipitation stage at calcium depleted water inlet 7. Suitable means are provided for the passage of calcium depleted water from outlet 6 to inlet 7. Additional chemicals, such as chemicals to cause the precipitation of magnesium, iron, silica and the like including chemicals to cause flocculation of suspended particles if required, are added at chemical feed inlet 8. Any chemicals or other adjuvants can be added at chemical feed inlet 8. The chemicals and the calcium depleted water mix in mixing and downflow zone 9 where additional precipitates form. These precipitates accumulate in the sludge blanket and upflow zone designated by numeral 10 in the secondary precipitation stage. The sludge accumulates in sludge concentrator 11 and is removed at the sludge blowdown outlet designated by numeral 12 where the sludge passes to a lagoon, dryer, or other disposal unit. The softened water is removed from the secondary precipitation stage at softened water outlet 13.

In accordance with this invention, raw water enters an inverted, frusto-conical tank (stage 1) where it is treated with lime to cause the precipitation of substantial amounts of calcium hardness from the raw water in the form of calcium carbonate. The calcium carbonate sand-like material can be easily handled, drained and disposed of. The calcium depleted water prepared in stage 1 then passes to stage 2 where it is further treated with additional chemicals to remove additional hardness ions, such as magnesium, silica, iron and other ingredients found therein, depending upon the impurities found in the raw water being treated. A paste-like sludge is formed in stage 2 and must be disposed of by lagooning or by some other method. The effluent of stage 2 is a softened water.

By utilizing the process of this invention that is, by treating raw water first in an inverted, frusto-conical tank in the presence of catalyst granules suspended therein, followed by treating the water therefrom in a secondary precipitation stage with additional chemical agents, we have surprisingly found that the total sludge volume in gallons is reduced by about 75% or more. Accordingly, sludge lagoons are required to handle only about 25% or less of the volume of sludge formerly discharged from the secondary precipitation softening system when used alone. The precipitate in the first stage which reduces by 75% or more (by weight) the sludge formed in the second stage, only requires 0.05 gallon of blowoff per pound of solids per 1000 gallons of water treated. When compared with the blowoff in a conventional softening system where the sludge is 2–10% solids, and where the 10% sludge requires 1.1 gallons of blowoff and the 2% sludge requires 6 gallons of blowoff, there is an improvement factor of from 22 to 120. The calcium carbonate blowdown from the inverted, frusto-conical first stage can be handled like sand and drains easily to approximately 95% solids almost immediately.

Figure 2:
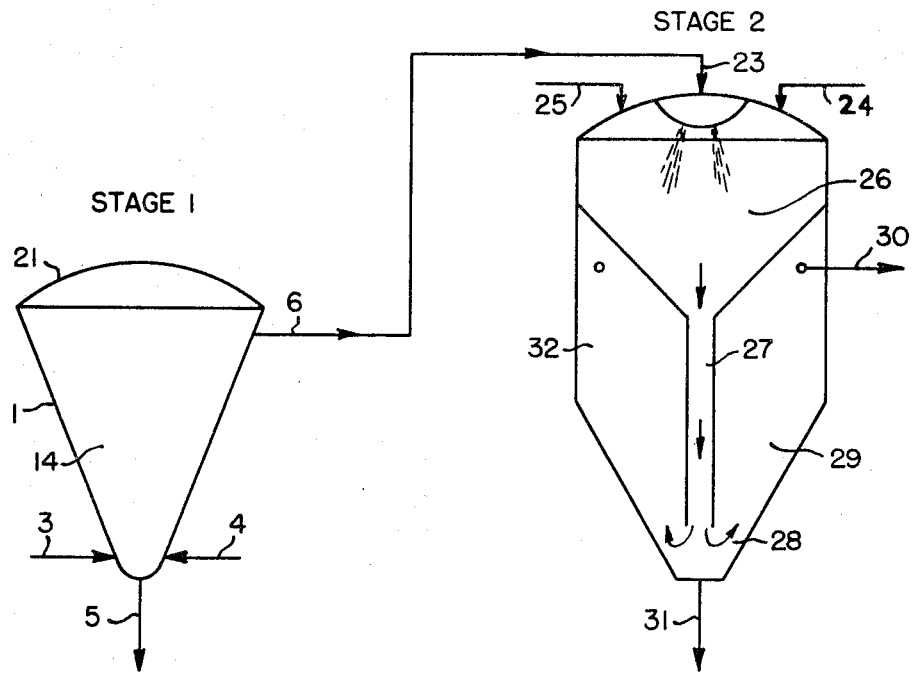
FIG. 2 is a schematic representation of a hot process water softening system consisting of an inverted, frusto-conical tank first stage and a solids contact, upflow, sludge blanket hot process precipitation second stage.

Another embodiment of the present invention is represented in FIG. 2 wherein stage 1 is a pressure type inverted, frusto-conical water softening unit which operates essentially the same as the unit described in FIG. 1. The numerals designated in FIG. 2 for the inverted, frusto-conical first stage are the same numerals designated for stage 1 in FIG. 1 with the exception that numeral 21 of FIG. 2 designates a lid which closes the conical tank and thereby makes stage 1 of FIG. 2 a pressure vessel. However, it must be noted that stage 1 in any of the processes of the present invention can be a gravity feed, inverted, frusto-conical tank or a pressurized inverted, frusto-conical tank, and the invention or particular embodiments thereof should not be limited to the type of inverted, frusto-conical tank shown.

In FIG. 2 the calcium depleted water passes from calcium depleted water outlet 6 and enters a hot process, solids contact, upflow, sludge blanket precipitation stage (hot process water softener) designated by numeral 32 at calcium depleted water inlet 23. Steam enters the hot process water softener at numeral 25. The steam heats the calcium depleted water influent so that the reaction between the water and influent chemicals added to stage 2 at chemical feed inlet 24, takes place more rapidly and effectively. In stage 2 precipitation of the remaining hardness elements, that is, minor amounts of calcium and substantial amounts of magnesium and other ingredients takes place. In the embodiment shown in FIG. 2, stage 2 comprises an upper reaction compartment or precipitation and mixing zone designated by numeral 26 shaped like a funnel and enclosed in an outer shell. The downcomer of the funnel designated by numeral 27 extends into the lower regions of the vessel formed by the outer shell. The end of the downcomer extends into an area designated by numeral 28 which defines the suspended sludge bed zone. The suspended sludge bed zone 28 is the area in which the precipitates accumulate and form a sludge blanket. The sludge blanket is maintained in suspension by the upward flow of the treated water which also passes through downcomer 27. As the treated water flows through this sludge blanket most of its turbidity is trapped in the suspended sludge and removed. When the suspended sludge consists of magnesium hydroxide precipitate or when portions thereof consist of magnesium hydroxide, silica is absorbed thereby and is thus removed from the water being treated. Iron, manganese and other precipitates also accumulate in sludge bed zone 28. Color may also be removed in the area of sludge bed zone 28. The effluent water continues in a upward flow in upflow zone 29 and clarified and completely softened water exits from the tank through a collecting system in the upper region of the lower compartment at softened water outlet 30. When sludge accumulates in the lower regions of the lower compartment, it is removed from stage 2 at sludge blowdown outlet 31 and passes to a lagoon, dryer or other disposal system. The sludge which is formed and emitted from the second stage of FIG. 2, that is the hot process solids contact, upflow, sludge blanket precipitation stage, is a pasty material and is difficult to dewater. Accordingly, considerable effort and time are involved in removing the water therefrom. However, since substantial amounts of the precipitate, at least about 75% or more, is removed by the first stage, then only about 25% or less of the paste-like sludge which is 2–10% solids, from the second stage must be dewatered by lagooning or by some other appropriate method.

Other embodiments of the second precipitation stage of the present invention may be used in place of those designated in FIGS. 1 and 2. For example the precipitation stage of FIG. 1 or FIG. 2 may be replaced by a precipitation unit of the type wherein the precipitant settles to the bottom of the reaction chamber of the unit and the effluent softened water passes from the upper regions of the unit without any upflow of the water being treated through the sludge blanket as described in stage 2 of FIGS. 1 and 2. Other cold process water softeners designated in the art as horizontal and vertical solids contact units may also be used in the present process. Thus, precipitation stage, second precipitation stage or secondary precipitation stage as used herein refer to the hot process, solids contact, upflow, sludge blanket type of FIG. 2, the cold process, solids contact, upflow, sludge blanket type of FIG. 1, the horizontal and vertical solids contact, upflow sludge blanket types, the hot process or cold process precipitate settling type in which there is little or no upflow through a sludge blanket and the like. "Conventional" water softeners of the rapid-mixing, flocculation, sedimentation type may also be used as a precipitation stage in the process of this invention. Auxiliary equipment, such as, ion exchange columns, filters, settlers and the like can be added to the present system by one skilled in the art.

The sludge accumulated in the second precipitation stage containing 10% solids by weight (that is, a sludge containing 10% solids and 90% water), requires 1.1 gallons of blowoff effluent per pound of solids per 1000 gallons of liquid treated; 6.0 gallons of blowoff per pound of solids per 1000 gallons of liquid treated is required when the sludge contains 2% solids and 98% liquid. Blowoff is the water which has accumulated in the particular stage and which has been treated in that particular stage, required to remove the sludge which has accumulated in that particular stage. The 0.05 gallon of blowoff for a sludge of 75% solids obtained by the present invention compared with a 6.0 gallons of blowoff for a sludge containing 2% solids of the conventional precipitators comprises an improvement factor of 120.

The solid material removed from the first stage, that is, the inverted, frusto-conical tank, at about 75% or higher solids by weight drains quickly due to the almost spherical nature of the particles. The resultant material, after draining, is approximately 95% solids by weight. In this almost dry condition, the particles or drained sludge from the first stage are easily handled in a manner similar to sand. The sludge from the second precipitation stage is a paste-like sludge and retains water. This sludge from the second precipitation stage must be disposed of by means of lagoons, drying, and the like.

In another embodiment of this invention, raw water containing high concentrations of magnesium hardness, that is, in excess of 80 p.p.m., as well as calcium hardness, is first treated in a first stage inverted, frusto-conical tank in the presence of catalyst granules to reduce the calcium hardness, and the calcium depleted water therefrom containing high concentrations of magnesium hardness then passes to a precipitation stage of the hot process, upflow, solids contact, sludge blanket type where the magnesium hardness is precipitated in the form of magnesium hydroxide to form a sludge blanket therein containing large amounts of magnesium hydroxide. When the raw water influent contains silica, which is especially undesirable in certain boiler and cooling tower applications for softened water, the magnesium hydroxide in the sludge blanket removes the silica as the water passes through the magnesium hydroxide sludge blanket on passage through the upflow zone and the softened water passes from the second stage not only depleted of the calcium and magnesium hardness but also depleted of silica.

It is to be understood that although the invention has been described with specific reference to particular embodiments thereof, it is not to be so limited since changes and alterations therein may be made which are within the full intended scope of this invention as defined by the appended claims.

I claim:
1. The process of reducing the volume of sludge precipitated and accumulated in the softening of raw water with chemical agents for the removal of substantially all calcium hardnesss and magnesium hardness as well as silica, iron, manganese, turbidity or other impurities found in said water, comprising:
  (a) passing said raw water containing magnesium in excess of 80 p.p.m. and a chemical agent selected from the group consisting of lime and lime-soda ash in a turbulent flow pattern in an inverted, frusto-conical tank containing catalyst granules suspended in said raw water by the turbulent flow pattern to cause a mixing of said raw water, chemical agent and catalyst granules and thereby form a granular precipitate containing substantial amounts of calcium hardness removed from said raw water as calcium carbonate precipitate and a calcium hardness depleted water;
  (b) removing said granular precipitate from said inverted, frusto-conical tank, said granular precipitate containing at least 75% solids by weight and 25% or less water when removed therefrom;
  (c) draining the water from said granular precipitate to provide an easily handled sandlike material containing about 5% by weight water;
  (d) removing said calcium depleted water from said inverted, frusto-conical tank;
  (e) contacting said calcium depleted water with chemical agents in a precipitation stage having a sludge accumulation area and a softened water outlet to provide a completely softened water and a low volume of sludge having a paste-like consistency and a solids content of about 2–10% and a liquid content of about 90–98%; and
  (f) removing said sludge from said precipitation stage for removal of said liquid and disposal of said solids, whereby the sludge volume is reduced by at least about 75%.

2. The process carried out in accordance with claim 1 wherein the precipitation stage is the cold process, solids contact, upflow, sludge blanket type.

3. The process carried out in accordance with claim 1 wherein the precipitation stage is the hot process, solids contact, upflow, sludge blanket type.

4. The process carried out in accordance with claim 3 wherein the precipitate which accumulates as a sludge in said sludge accumulation area contains magnesium hydroxide which removes silica from said raw water when said raw water contains silica.

5. The process of reducing the volume of sludge by at least about 75% in the chemical softening of raw water in a water softener having at least a water inlet a sludge accumulation area, means for removing sludge and a softened water outlet, wherein substantially all calcium and magnesium hardness as well as silica, iron, manganese, turbidity or other impurities found in said water are removed, comprising pre-treating said raw water containing magnesium in excess of 80 p.p.m. with a chemical selected from the group consisting of lime and lime-soda ash in the presence of a granular catalyst suspended in an inverted, frusto-conical tank having at least one tangential raw water inlet, a chemical inlet and a blowdown outlet near the bottom of said tank and a water outlet near the top of said tank, wherein said raw water enters said tank through said raw water inlet and said raw water and chemicals injected at said chemical inlet mix and pass at a high rate of turbulent flow through said granular catalyst to provide a calcium depleted water which passes from said tank at said water outlet to said water softener for additional chemical softening, and a granular precipitate which is removed at said blowdown outlet and which consists of at least about 75% solids by weight.

6. The process of reducing the volume of sludge precipitated and accumulated in the softening of raw water containing magnesium in excess of 80 p.p.m. with chemical agents in an apparatus consisting of an inverted, frusto-conical tank first stage having at least one tangential raw water inlet, a chemical inlet and a blowdown outlet near the bottom of said tank and a water outlet near the top of said tank and a second precipitation stage having inlet means for water and chemicals, a sludge accumulation area, a softened water outlet and a sludge blowdown outlet, for the removal of substantially all calcium and magnesium hardness as well as silica, iron, manganese, turbidity or other impurities, which process comprises:
  (a) feeding raw water into said first stage at said raw water inlet;
  (b) passing said raw water and a chemical agent selected from the group consisting of lime and lime-soda ash in a turbulent flow pattern in said frusto-conical tank in the presence of catalyst granules suspended in said raw water by the turbulent flow pattern to cause a mixing of said raw water, chemical agent and catalyst granules and thereby form a granular precipitate containing substantial amounts of calcium hardness removed from said raw water as calcium carbonate precipitae and a calcium hardness depleted water;
  (c) removing said granular precipitate from said inverted, frusto-conical tank, said granular precipitate containing at least 75% solids by weight and 25% or less water by weight when removed therefrom;
  (d) draining the water from said granular precipitate to provide an easily-handled sand-like material containing about 5% by weight water;
  (e) passing said calcium depleted water from said inverted, frusto-conical tank to said second precipitation stage;
  (f) contacting said calcium depleted water with chemical agents in said second precipitation stage to provide a completely softened water and a low volume of paste-like sludge having a solids content of about 2 to 10% by weight and a liquid content of about 90 to 98%; and
  (g) removing said paste-like sludge from said sludge blowdown outlet of said second precipitation stage for separation of said liquid from said solids and disposal of said solids;
whereby the sludge volume resulting from the chemical softening of raw water is reduced by at least about 75%.

7. A process for the softening of raw water containing high concentrations of magnesium and calcium hardness with chemical agents while simultaneously reducing the volume of sludge precipitated and accumulated thereby, comprising:
  (a) treating said raw water having a magnesium hardness in excess of 80 p.p.m. with a chemical selected from the group consisting of lime and lime-soda ash, in the presence of a granular catalyst suspended in an inverted, frusto-conical tank having at least one tangential raw water inlet, a chemical inlet and a blowdown outlet near the bottom of said tank and a water outlet near the top of said tank, wherein said raw water enters said tank through said raw water inlet and said raw water and chemical injected at said chemical inlet mix and pass at a high rate of turbulent flow through said granular catalyst to provide a calcium depleted water having a high concentration of magnesium hardness which passes from said tank at said water outlet, and a granular precipitate consisting of at least 75% solids by weight, said granular precipitate containing substantial amounts of precipitated calcium and minor amounts of precipitated magnesium which is removed at said blowdown outlet; and
  (b) treating said calcium depleted water having a high concentration of magnesium hardness with additional chemical agents in a hot process, solids contact, upflow, sludge blanket precipitation stage having a sludge accumulation area and a softened water outlet to form completely softened water depleted of magnesium hardness which passes from said precipitation stage at said softened water outlet and a precipitate containing substantial amounts of precipitated magnesium hardness in the form of magnesium hydroxide, which accumulates as a sludge in said sludge accumulation area and which is removed from said precipitation stage at said sludge blowdown outlet, said sludge having a solids content of about 2–10% solids whereby the sludge volume normally accumulating from the chemical softening of water containing calcium and magnesium hardness in a hot process, solids contact, upflow, sludge blanket precipitation unit is reduced by at least about 75%.

8. A process in accordance with claim 7 further comprising the removal of silica impurities from said calcium depleted water having a high concentration of magnesium hardness by passing said calcium depleted water containing silica through said sludge blanket.

References Cited
UNITED STATES PATENTS

| | | | |
|---|---|---|---|
| 2,259,717 | 10/1941 | Zentner | 210—46 X |
| 2,428,418 | 10/1947 | Goetz et al. | 210—46 |
| 2,401,924 | 6/1946 | Goetz | 210—46 |
| 2,604,444 | 7/1952 | Piccardo | 210—46 |
| 2,668,144 | 2/1954 | Joos | 210—46 |

SAMIH N. ZAHARNA, Primary Examiner

T. G. WYSE, Assistant Examiner

U.S. Cl. X.R.
210—53, 56

UNITED STATES PATENT OFFICE
CERTIFICATE OF CORRECTION

Patent No. 3,740,330    Dated June 19, 1973

Inventor(s) J. S. Kneale

It is certified that error appears in the above-identified patent and that said Letters Patent are hereby corrected as shown below:

Column 3, Line 25, delete "Wherein water having much higher concentrations of" and insert instead -- or hot process water softeners. --

Signed and sealed this 12th day of March 1974.

(SEAL)
Attest:

EDWARD M. FLETCHER, JR.
Attesting Officer

C. MARSHALL DANN
Commissioner of Patents